(12) United States Patent  
Cooley

(10) Patent No.: US 9,992,175 B2  
(45) Date of Patent: Jun. 5, 2018

(54) SYSTEMS AND METHOD FOR PROVIDING A DATA SECURITY SERVICE

(71) Applicant: Moneygram International, Inc., Minneapolis, MN (US)

(72) Inventor: Aaron Ferguson Cooley, Oakland, CA (US)

(73) Assignee: Moneygram International, Inc., Minneapolis, MN (US)

( * ) Notice: Subject to any disclaimer, the term of this patent is extended or adjusted under 35 U.S.C. 154(b) by 148 days.

(21) Appl. No.: 14/991,533

(22) Filed: Jan. 8, 2016

(65) Prior Publication Data

US 2017/0201495 A1 Jul. 13, 2017

(51) Int. Cl.
*H04L 29/06* (2006.01)
*G06F 17/30* (2006.01)
*G06Q 20/40* (2012.01)

(52) U.S. Cl.
CPC .... *H04L 63/0428* (2013.01); *G06F 17/30312* (2013.01); *G06Q 20/401* (2013.01); *G06Q 2220/10* (2013.01)

(58) Field of Classification Search
CPC .......... H04L 63/0428; G06F 17/30312; G06Q 20/401; G06Q 2220/10
See application file for complete search history.

(56) References Cited

U.S. PATENT DOCUMENTS

| 5,058,025 | A | * | 10/1991 | Haines | G07B 17/0008 235/382 |
| 5,077,660 | A | * | 12/1991 | Haines | G07B 17/0008 705/410 |
| 5,107,455 | A | * | 4/1992 | Haines | G07B 17/0008 705/60 |
| 5,369,401 | A | * | 11/1994 | Haines | G07B 17/0008 340/5.9 |
| 5,699,415 | A | * | 12/1997 | Wagner | G07B 17/0008 380/43 |
| 6,574,611 | B1 | * | 6/2003 | Matsuyama | G06F 21/10 380/30 |
| 6,587,843 | B1 | * | 7/2003 | Gelfer | G07B 17/00733 705/403 |
| 7,577,617 | B1 | * | 8/2009 | Reisinger | G07B 17/0008 101/71 |
| 8,079,081 | B1 | * | 12/2011 | Lavrik | H04L 41/069 709/223 |

(Continued)

*Primary Examiner* — David García Cervetti
(74) *Attorney, Agent, or Firm* — Norton Rose Fulbright US LLP

(57) ABSTRACT

Systems, methods, and computer-readable media for providing standards compliant encryption, storage, and retrieval of date are disclosed. In an embodiment, data is received at a first data center from a first device in connection with a service request, and encrypted to produce encrypted data. The encrypted data may be transmitted from the first data center to the first device, and then may subsequently be received at a second data center. The second data center may store the encrypted data in a database accessible to the second data center. Because all data provided to the system is encrypted by the first data center prior to being stored and/or provided to the second data center, the database and the second data canter may be out of the scope of compliance monitoring, auditing, and reporting for one or more date security standards.

28 Claims, 3 Drawing Sheets

(56) References Cited

U.S. PATENT DOCUMENTS

| | | | | |
|---|---|---|---|---|
| 8,156,553 B1* | 4/2012 | Church | G06Q 10/06 | 709/224 |
| 8,407,335 B1* | 3/2013 | Church | G06F 11/0709 | 709/218 |
| 8,824,674 B2* | 9/2014 | Ogawa | H04L 9/0861 | 380/44 |
| 9,552,496 B2* | 1/2017 | Daly, Jr. | G06F 21/6272 | |
| 2002/0161722 A1* | 10/2002 | Matsushima | G06F 21/6263 | 705/67 |
| 2005/0044225 A1* | 2/2005 | Ota | H04L 29/06 | 709/225 |
| 2006/0064590 A1* | 3/2006 | Bleumer | H04L 9/0838 | 713/171 |
| 2007/0050314 A1* | 3/2007 | Martin | G06Q 50/32 | 705/403 |
| 2007/0073628 A1* | 3/2007 | Pauly | G07B 17/00733 | 705/62 |
| 2007/0180227 A1* | 8/2007 | Akimoto | H04L 63/0464 | 713/153 |
| 2008/0075291 A1* | 3/2008 | Kamijoh | H04L 9/0836 | 380/279 |
| 2008/0301387 A1* | 12/2008 | Heinrich | G07B 17/0008 | 711/162 |
| 2008/0317248 A1* | 12/2008 | Naono | H04L 63/0428 | 380/255 |
| 2009/0171848 A1* | 7/2009 | Wronski, Jr. | G07B 17/00435 | 705/60 |
| 2010/0211781 A1* | 8/2010 | Auradkar | G06F 21/6209 | 713/168 |
| 2010/0211782 A1* | 8/2010 | Auradkar | H04L 9/083 | 713/168 |
| 2010/0281265 A1* | 11/2010 | Ogawa | G06F 21/10 | 713/176 |
| 2010/0318782 A1* | 12/2010 | Auradkar | G06F 11/1451 | 713/150 |
| 2010/0318812 A1* | 12/2010 | Auradkar | G06F 11/1464 | 713/193 |
| 2011/0060638 A1* | 3/2011 | Zucker | G06Q 30/02 | 705/14.27 |
| 2011/0106710 A1* | 5/2011 | Reed | G06Q 20/20 | 705/71 |
| 2011/0119481 A1* | 5/2011 | Auradkar | G06F 21/602 | 713/150 |
| 2011/0145580 A1* | 6/2011 | Auradkar | H04L 63/0428 | 713/170 |
| 2011/0145593 A1* | 6/2011 | Auradkar | G06F 21/6218 | 713/189 |
| 2013/0179005 A1* | 7/2013 | Nishimoto | B60R 25/1001 | 701/2 |
| 2013/0287210 A1* | 10/2013 | Matsuda | H04L 9/0894 | 380/44 |
| 2013/0297516 A1* | 11/2013 | Mampaey | G06Q 20/02 | 705/71 |
| 2013/0332736 A1* | 12/2013 | Kawamura | H04L 9/0869 | 713/171 |
| 2014/0073254 A1* | 3/2014 | Ichihara | G07C 5/008 | 455/41.2 |
| 2014/0079221 A1* | 3/2014 | McCallum | H04L 9/0822 | 380/277 |
| 2014/0082749 A1* | 3/2014 | Holland | G06F 21/60 | 726/29 |
| 2014/0126719 A1* | 5/2014 | Kawamura | H04L 9/0816 | 380/44 |
| 2014/0215171 A1* | 7/2014 | Daly, Jr. | G06F 11/1451 | 711/162 |
| 2014/0281514 A1* | 9/2014 | Erofeev | G06F 21/6218 | 713/165 |
| 2015/0363769 A1* | 12/2015 | Ronca | G06Q 20/381 | 705/64 |
| 2015/0363770 A1* | 12/2015 | Ronca | G06Q 20/382 | 705/66 |
| 2015/0363772 A1* | 12/2015 | Ronca | G06Q 20/065 | 705/71 |
| 2015/0363773 A1* | 12/2015 | Ronca | G06Q 20/3829 | 705/71 |
| 2015/0363777 A1* | 12/2015 | Ronca | G06Q 20/401 | 705/75 |
| 2015/0363778 A1* | 12/2015 | Ronca | G06Q 20/065 | 705/71 |
| 2015/0363782 A1* | 12/2015 | Ronca | G06Q 20/4016 | 705/75 |
| 2015/0363783 A1* | 12/2015 | Ronca | G06Q 20/4016 | 705/71 |
| 2015/0363876 A1* | 12/2015 | Ronca | G06Q 40/04 | 705/37 |
| 2015/0365283 A1* | 12/2015 | Ronca | H04L 41/0816 | 705/71 |
| 2016/0078245 A1* | 3/2016 | Amarendran | G06F 21/6218 | 713/193 |
| 2016/0337465 A1* | 11/2016 | Tarre | H04L 67/2823 | |
| 2017/0090799 A1* | 3/2017 | Daly, Jr. | G06F 3/0619 | |
| 2017/0116433 A1* | 4/2017 | Erofeev | G06F 21/6218 | |

* cited by examiner

SYSTEMS AND METHOD FOR PROVIDING A DATA SECURITY SERVICE

TECHNICAL FIELD

This invention relates to systems and methods for encryption and storage of data, and more particularly to improving systems and methods for providing standards compliant encryption, storage, and retrieval of data.

BACKGROUND

The use of web-based systems has proliferated for many years, and as the use of web-based systems has grown, so too has the amount of data that is communicated between end-users and the web-based systems. The data communicated between the end-users and the web-based systems often includes sensitive information (e.g., credit card numbers, bank account numbers, social security numbers, driver's license numbers, etc.). Many web-based systems retain this sensitive information for various purposes. For example, some e-commerce websites store user credit card information so that the user does not have to provide that information each time they perform a transaction with the e-commerce website.

Various data security techniques and protocols have been developed to protect sensitive user data from exposure to unauthorized third parties. One such protocol is the payment card industry data security standard (PCI DSS) which was developed to increase controls for protecting cardholder data and to reduce credit card fraud caused by unauthorized exposure of the cardholder data. The PCI DSS defines various safeguards and data protection methods that should be used by entities that process, store, and/or transmit financial card information. While compliance with PCI DSS is not mandated by federal laws, many states have either referenced the PCI DSS, made equivalent provisions, or incorporated the PCI DSS into state law. Further, compliance with the PCI DSS may shield entities that process cardholder data from liability in the event that the cardholder data is breached (e.g., accessed by an unauthorized third party).

For many entities, establishing PCI DSS compliance can be a costly and time consuming process. For example, a user may enter cardholder data (e.g., credit card number, expiration date, control verification value (CVV), etc.) into a form on a website using an electronic device, such as a smart phone, tablet computing device, or other personal computer/laptop. When the user submits the form the cardholder date may be encrypted using transport layer security (TLS) and transmitted to a web server via a hypertext transfer protocol secure (HTTPS) communication link. Upon receiving the cardholder information, the web server may invoke an application programming interface (API) call that processes the cardholder information to facilitate a transaction. In addition to processing the cardholder information, the API call may create a log entry that includes at least a portion of the cardholder data, and the log may be written to storage. When the cardholder information is stored in the log entry, the cardholder data becomes at rest data (e.g., stored data), and any systems accessing and/or storing the at rest data may be subject to monitoring, auditing, and reporting for compliance with the PCI DSS. For example, when the web server stores the cardholder information at a data center, both the web server and the data center may be subject to PCI DSS compliance monitoring, auditing, and reporting to verify that the cardholder information has not been stored in an unprotected format (e.g., as unencrypted data). As the number of systems accessing the data center increases, the scope and cost of PCI DSS compliance monitoring, auditing, and reporting may also increase.

Compliance monitoring, auditing, and reporting is further complicated and becomes more costly when techniques used for compliance monitoring, auditing, and reporting are performed statically. That is, when a system is configured to perform monitoring, auditing, and reporting in a certain way based on a current state of the relevant compliance standard (e.g., PCI DSS), changes to the compliance standard may require that the entire monitoring, auditing, and reporting protocols implemented by the system, as well as safeguards, such as when, where, and how data is stored, be retooled/reprogrammed, etc. to ensure compliance under the modified compliance standard. This further increases the costs of monitoring, auditing, and reporting for compliance purposes.

SUMMARY

The present disclosure is directed to embodiments of systems, methods, and computer-readable storage media for encryption and storage of data using multiple data centers that provides a simple, dynamic, and scalable solution for compliance monitoring, auditing, and reporting processes, and that reduces the costs of implementing the compliance monitoring, auditing, and reporting processes. In an embodiment a first data center provides for encryption and decryption of sensitive data utilizing a compliant protocol standard. The encrypted data generated fey the first data center is then provided back the appropriate device, and the device may then communicate the encrypted data to a second data center that provides business logic for providing one or more services to a user of the device based on the encrypted data. The second data center may include a database that may store the encrypted data. When a device needs to access the data (e.g., in either an encrypted or unencrypted format), the device may communicate a request for the data to the first data center, and the first data center may retrieve the requested data in an encrypted format from the database of the second data center. If the data is requested in an encrypted format, the data may be retrieved and communicated to the end-point device by the first data center without decrypting the data. If the data is requested in an unencrypted format, the data may be retrieved and decrypted by the first data center prior to being communicated from the first data center to the end-point device. Thus, all unencrypted data is processed by the first data center, and all information provided to, or retrieved from, the second data center is encrypted according to the appropriate compliance monitoring, auditing, and reporting standard, such as the PCI DSS.

Compliance monitoring, auditing, and reporting processes for systems configured according to embodiment may be simplified in many ways. For example, only the first data center may be subject to compliance monitoring, auditing, and reporting because all unencrypted data entering or leaving the system flows through the first data center only (i.e., the second data center does not receive or store unencrypted data). Further, because the first data center does not include a database store user data, the risk of unencrypted data being stored at rest may be eliminated or at least greatly reduced. Additionally, the second data center may be outside of the scope of the compliance monitoring, auditing, and reporting process because all data stored in the database of the second data center is stored in a compliant encryption format, thereby eliminating the risk that unencrypted data is stored at rest in the database of the second data center.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized in a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements with the spirit and/or scope of the underlying inventive concept will become apparent to those skilled in the art from this disclosure.

Figure 1:
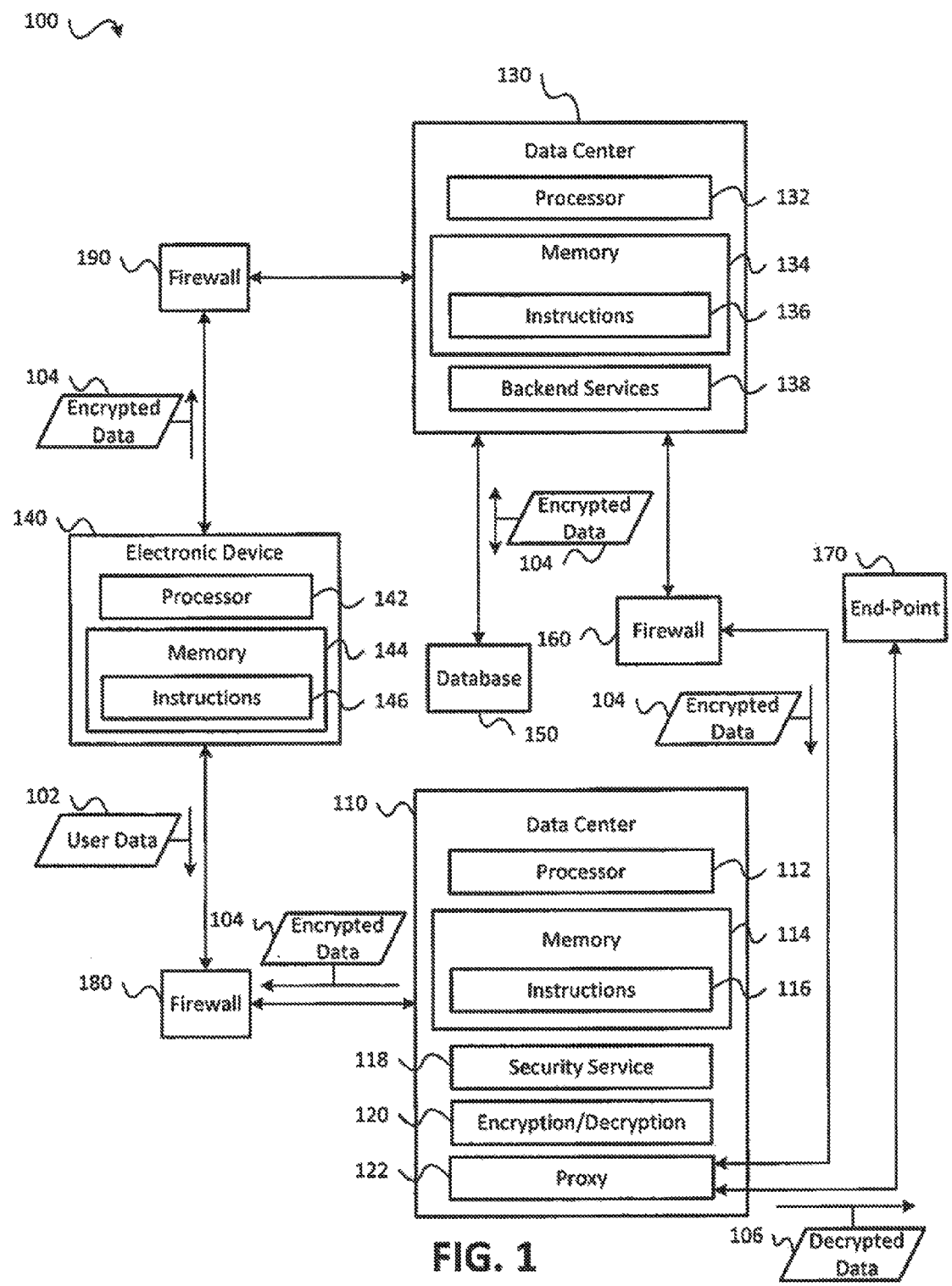
FIG. 1 is a block diagram illustrating aspects of an embodiment of a system for providing standards compliant encryption, storage, and retrieval of data.

Referring to FIG. 1, a block diagram illustrating aspects of an embodiment of a system for providing standards compliant encryption, storage, and retrieval of data is shown as a system 100. As shown in FIG. 1, the system 100 includes a data center 110, a data center 130, a database 150, a firewall 160, and firewalls 180, 190. The system 100 may be communicatively coupled to an electronic device 140 and an end-point device 170 via one or more networks (not shown in FIG. 1). It is noted that although FIG. 1 illustrates a single electronic device 140 and a single end-point 170, systems configured according to embodiments of the present disclosure, such as the system 100 of FIG. 1, may be communicatively coupled to more than one electronic device 140 and/or more than one end-point device 170. Further, some systems configured according to embodiments of the present disclosure, such as the system 100 of FIG. 1, may not be communicatively coupled to an electronic device 140 or may not be communicatively coupled to an end-point device 170. Thus, embodiments of the present disclosure should not be limited to a particular number of electronic devices 140 and end-point devices 170.

As illustrated in FIG. 1, the data center 110 includes a processor 112, a memory 114, a security service 118, as encryption/decryption service 120, and a proxy 122. In an embodiment, the memory 114 may store instructions 116 that, when executed by the processor 112, cause the processor 112 to perform the operations described with respect to the data center 110 with reference to FIGS. 1-3. For example, the instruction 116 may include instructions that, when executed by the processor 112, came the processor 112 to provide the security service 118 and/or the encryption/decryption service 120. In an embodiment, the security service 118 may be configured to encrypt data received from the electronic device 140 and/or the end-point device 170, to provide the encrypted data to the electronic device 140 and/or the end-point device 170, and/or to decrypt encrypted data that is retrieved from the data center 130, as described in more detail below. In an embodiment, the encryption provided by the security service 118 may include tokenization of the data. In an additional or alternative embodiment, the encryption provided by the security service 118 may comply with one or more data security standards, such as the PCI DSS. In an embodiment, the encryption/decryption service 120 may be configured to manage encryption and decryption keys that are utilized by the security service 118 to encrypt and decrypt data, as described in more detail below. In an embodiment, the proxy 122 may provide an interface that allows the end-point device 170 to access functionality of the system 100, such as for providing data to, or retrieving data from, the system 100, as described in more detail below. In an embodiment, the data center 110 does not include a database for storing user data.

The data center 130 includes a processor 132, a memory 134, and backend services 138. In an embodiment, the memory 134 may store instructions 136 that, when executed by the processor 132, cause the processor 132 to perform the operations described with respect to the data center 130 with reference to FIGS. 1-3. For example, the instructions 136 may include instructions that, when executed by the processor 132, cause the processor 132 to provide the backend servicers 138. In an embodiment, the backend services 138 may be provided to users, such as a user of the electronic device 140 and/or an entity associated with the end-point device 170, and may utilize data that has been encrypted by the data center 110, as described in more detail below. In an embodiment, the backend services 138 may be facilitated by one or more application programming interfaces (APIs). In an embodiment, the data center 130 may provide business logic configured to provide the backend services 138 to a user of the electronic device 148. The one or more backend services 138 may utilize user data that has been encrypted by the data center 110. In an embodiment, the backend services 138 provided by the business logic may include a money transfer service, a prepaid card loading service, a bill pay service, an e-commerce service, or a combination thereof. In an embodiment, the data center 130 does not include decryption and encryption functionality. Thus, in some embodiments, the data center 130 may be incapable of decrypting and/or altering the encrypted data received from, or provided to various external devices, such as the electronic device 140, the end-point device 170, and the data center 110.

As shown in FIG. 1, the electronic device 140 includes a processor 142 and a memory 144. In an embodiment, the memory 144 may store instructions 146 that, when executed by the processor 142, cause the processor 142 to perform the operations described in connection with the electronic device 140 with reference to FIGS. 1-3. In an embodiment, the electronic device 140 may be operated by the same entity that operates the data centers 110, 130. For example, in an embodiment, the data centers 110, 130 may be operated by a money transfer network entity, and the electronic device 140 may be a kiosk operated by the money transfer network entity (e.g., at a money transfer agent location, a retail store location, etc.). In an additional or alternative embodiment, the electronic device 140 may be a user device, such as a smart phone, personal digital assistant, laptop computing device, tablet computing device, and the like, that is operated by an individual other than the entity providing the data centers 110, 130. For example, in an embodiment, the electronic device 140 may be a smart phone that includes an application (e.g., stored as the instructions 146) that is used to provide one or more services to the user of the electronic device 140. The application may communicate with the data centers 110, 130 to provide a service (e.g., a money transfer service, a prepaid card loading service, and the like) to the user, as described in more detail below. As illustrated in FIG. 1, in an embodiment, the electronic device 140 may be communicatively coupled to the data center 110 via a first secure communication link (e.g., the communication link facilitated by the firewall 180), and the electronic device 140 may be communicatively coupled to the data center 130 via a second secure communication link (e.g., the communication link facilitated by the firewall 190).

In an embodiment, the end-point device 170 may be a point of sale system (POS) that communicates with the data center 130 via the proxy 122 in connection wife utilizing one or more of the backend services 138, as described in more detail below. In an additional or alternative embodiment, the end-point device 170 may fee a portal that interfaces the data centers 110, 130 to a third party system. For example, the end-point device 170 may be a portal that interfaces the data centers 110, 130 with a credit card processing system (e.g., a portal for processing Visa® credit card payments). In still another additional or alternative embodiment, the end-point device 170 may be a web-server, such as a web-server that provides online shopping services to consumers.

During operation, a user may use the electronic device 140 and/or the end-point device 170 to access a service (e.g., one of the backend services 138) provided by an operator of the data centers 110, 130. The service may require that the user provide various information that is relevant to the accessed service. Depending on the service, the data provided by the user may include sensitive data, such as a credit card information, driver's license information, passport information, bank account information, and the like. When the information provided in connection with the service includes sensitive data, the electronic device 140 and/or the end-point device 170 may be configured to transmit the sensitive information to the data center 110. The data center 110 may be configured to encrypt the sensitive data (e.g., using the security service 118 and the encryption/decryption service 120) to produce encrypted data, and the data center 110 may then transmit the encrypted data back to the electronic device 140 and/or the end-point device 170. In an embodiment, the data center 110 may encrypt the data using tokenization, and the encrypted data may be a token that is generated by the tokenization. In an embodiment, the data center 110 may be configured to not store the sensitive data at rest.

The electronic device 140 and/or the end-point device 170 may receive the encrypted data from the data center 110, and may transmit the encrypted data to the data center 130 in connection with accessing the one or more backend services 138. For example, when the service is an online purchase, the encrypted data may take the form of a token generated from credit card information, and the backend service accessed by the electronic device 140 and/or the end-point device 170 may facilitate processing of the purchase (e.g., using the token without having to receive the sensitive data). In an embodiment, the encrypted data may be stored as an entry in the database 150. For example, the accessed service may generate a log of transactions, and the log may include the encrypted data processed during each of the transactions. Because the data center 130 only receives encrypted data, and because the database 150 only stores encrypted data, the data center 130 and the database 150 may be outside the scope of compliance auditing for various purposes/standards. For example, the data center 130 and database 150 of embodiments may be outside the scope of PCI DSS monitoring, auditing, and reporting because sensitive information is never stored at the data center 130 and the database 150 in an unencrypted format. Thus, in the system 100 illustrated in FIG. 1, only the data center 110 may be subject to PCI DSS monitoring, auditing, and reporting. This may greatly reduce the costs associated with implementing PCI DSS compliance monitoring, auditing, and reporting. Further, it is noted that the configuration illustrated in FIG. 1 may reduce the scope of compliance monitoring, auditing, and reporting for data security standards and data security protocols other than the PCI DSS.

Further, when a device (e.g., the electronic device 140 and/or the end-point device 170) desires to access the encrypted information, the device may transmit a request to the data center 110. In an embodiment, the request may be provided to the proxy 122, and the proxy 122 may communicate with the data center 130 through the firewall 160 via a secure connection such an https connection, a virtual private network connection or other form of network communication, to retrieve the requested data from the database 150. The requested date (e.g., in an encrypted format) may be retrieved from the database 150, and may be provided from the data center 130 to the data center 110 through the firewall 160 via a secure connection such an https connection, a virtual private network connection or other form of network communication, and the data center 110 may either: 1) decrypt the data and provide the decrypted data to the device; or 2) provide the encrypted data to the device. From the foregoing it is shown that all data provided to, or retrieved from, the data center 130 is in an encrypted format, and that decrypted data is only provided to, or provided from, the system 100 via the data center 110, which encrypts all incoming data (e.g., data to be stored or otherwise provided to the data center 130), and may decrypt some, but not necessarily all, outgoing data (e.g., data retrieved from the data center (130). Additional aspects of embodiments for processing data and providing services are described below with reference to FIGS. 1-3.

In an embodiment illustrative of a first exemplary mode of operation for the system 100, the electronic device 140 may be a kiosk device operated fey, or a mobile application provided by, a money transfer network entity. The money transfer network entity may also operate the data center 110 and the data center 130. The end-point device 170 may be a portal to a system operated by a credit card provider, a mosey transfer agent device located at a money transfer agent location, a web server, etc. During operation, a user may access the electronic device 140, and, using one or more graphical user interfaces (GUIs) presented by the electronic device 140, the user may provide information in connection with requesting a particular service (e.g., one of the backend services 138), such as a money transfer transaction, loading a prepaid card, a bill pay service, and the like. The one or more GUIs may prompt the user to enter various user data 102, which may include sensitive information. Rather than providing the user data 102 to the data center 130, and more particularly, the one or more backend services 138, the electronic device 140 may be configured to transmit the user data 102 to the data center 110. In an embodiment, the user data 102 may only be transmitted to the data center 110 when the user data 102 includes sensitive information. For example, the GUI may be programmed to determine whether a requested service requires the user to input sensitive information (e.g., credit card number, social security number, driver's license number, passport number, bank account information, and the like), and, in response to a determination that the requested service utilizes sensitive information, the electronic device 140 may transmit the user data 102 to the data center 110. In an embodiment, the electronic device 140 may be communicatively coupled to the data center 110 via a secure communication link. For example, the electronic device 140 may communicate with the data center 110 using an HTTPS or other security protocol. In an embodiment, the communication link between the electronic device 140 and the data center 110 may facilitated through the firewall 180.

The data center 110 may receive the user data 102 from the electronic device 140, and, in response to receiving the user data 102, the data center 110 may encrypt the user data 102 to produce encrypted data 104. In an embodiment, the user data 102 may be encrypted using tokenization, and the encrypted data 104 may be a token. In an embodiment, the user data 102 may be included in a body of a message. In an embodiment, the message may be a hypertext transfer protocol (HTTP) message, and the body of the HTTP message may include the data that is to be encrypted by the data center 110. In an embodiment, a header of the HTTP message may include information that identifies the location of the data within the body of the HTTP message. In an additional or alternative embodiment, the header of the HTTP message may include information that identifies a destination for the data, such that the data center 110 may provide the encrypted data 104 to the destination, rather than the electronic device 140, as described in more detail with reference to FIG. 2. In yet another additional or alternative embodiment, the header of the HTTP message may include information that identities a destination for the data, such that the data center 110 may provide the encrypted data 104 to both the destination and the electronic device 140.

After generating the encrypted data 104, the data center 110 may transmit the encrypted data 104 to the electronic device 140 and/or other destination devices depending on a configuration of the message (e.g., a configuration of HTTP headers, etc.). In response to receiving the encrypted data 104, the electronic device 140 may transmit the encrypted data 104 to the data center 130. In an embodiment, the encrypted data 104 may be transmitted to the data center 130 as a request to access one of the backend services 138. In response to receiving the encrypted data 104, the data center 130 may store the encrypted data 104 in the database 150. In an embodiment, the encrypted data 104 may be stored in the database 150 as a result of processing by one or more of the backend services 138. For example, a user may access the electronic device 140 to perform a transaction, such as loading funds onto a prepaid card, where the loading of the funds is provided by one of the backend services 138. The user may provide the user data 102 in response to prompts presented at the electronic device 140, and then the user data 102 may be communicated to the data center 110 for encryption and then the encrypted data 104 may be returned to the electronic device 140. The electronic device 140 may then provide the encrypted data 104 to the backend service 138, which may use the encrypted data 104 to load value onto the prepaid card. As a result of the transaction, the backend service 138 may create an entry in the database 150 that includes the encrypted data 104.

In an embodiment, access to the encrypted data stored at the database 150 may be provided by the data center 110. For example, the end-point device 170 may request access to the encrypted data 104 in connection with providing one of the backend services 138. In an embodiment, access to the encrypted data 104 may be provided to the end-point device 170 via the data center 110. The end-point device 170 may communicate a request to the proxy 122 of the data center 110, where the request indicates that the end-point device 170 is requesting access to the encrypted data 104. In response to receiving the request, the data center 110 may retrieve the encrypted data 104 from the database 150 of the data center 130. Upon receiving the encrypted data 104 from the data center 130 through the firewall 160 via a secure connection such an https connection, a virtual private network connection or other form of network communication, the data center 110 may decrypt the encrypted data 104 to produce decrypted data 106, and may provide the decrypted data 106 to the end-point device 170. The end-point device 170 may then process the decrypted data 106 to complete the transaction provided by the backend service 138. For example, in an embodiment, the end-point device 170 may be a portal that provides access to a financial card network operated by a financial card provider. If the backend service 138 accessed by the user of the electronic device 140 involves processing a credit card payment, the user data 102 may include financial card information, and the encrypted data 104 may include encrypted financial card information. The encrypted data 104 may be retrieved from the database 150 by the data center 110, and then provided from the data center 110 to the end-point device 170 for further processing (e.g., to complete the credit card payment). In an embodiment, the data center 110 may provide encrypted data 104 to the end-point device 170 without decrypting the encrypted data 104. In an additional or alternative embodiment, the data center 110 may decrypt the encrypted data 104 to generate the decrypted data 106, and may provide the decrypted data 106 to the end-point device 170. The end-point device 170 may then perform further processing of the data to facilitate the transaction requested by the user and/or the backend service 138. In an embodiment, the processing performed by the end-point device 170 may generate data that is to be stored in the database 150. In such instances, the data may be provided to the data center 110 where the data may be encrypted and subsequently provided through the firewall 160 via a secure connection such an https connection, a virtual private network connection or other form of network communication, to the data center 130 for storage in the database 150.

In an embodiment, the data center 110 may be monitored and periodically audited to determine whether data that has been encrypted by the data center 110 has been stored (e.g., in an unencrypted format) at rest within the data center 110. As explained above, in some embodiments, the data center 110 may not include a database for storing user data. Thus, the likelihood that user data is stored at rest within the data center 110 may be reduced or eliminated. This may increase the likelihood that the result of the monitoring and periodic auditing results in a determination that the data center 110 is compliant with various data privacy/security standards, such as the PCI DSS. Further, from the foregoing it has been shown that the data center 130 does not receive unencrypted sensitive user data, and that all sensitive user data stored in the database 150 is stored in an encrypted format. Additionally, in some embodiments, the data center 130 does not include decryption capabilities, and is therefore not capable of decrypting the sensitive user data stored in the database 150. This may prevent the data center 130 from inadvertently storing sensitive user data at rest in an unencrypted format within the data center 130 and/or the database 150. Accordingly, the data center 130 and the database 150 may be outside the scope of compliance monitoring, auditing, and reporting for various data privacy/security standards, such as the PCI DSS, which may significantly reduce the costs associated with implementing the compliance auditing, monitoring, and reporting, decrease the amount of time required to perform such tasks, and may increase the accuracy of such tasks. Further, the configuration of the system 100 shown in FIG. 1 may also provide a solution that is more easily scaled to accommodate increases in capacity. For example, if additional capacity for storing encrypted data and/or providing additional backend services 138 is required, the data center 130 and/or the database 150 may be expanded without expanding the scope of compliance monitoring, auditing, and reporting for various data privacy/security standards. Further, because the data center 110 does not store user data at rest, additional resources can be provided at the data center 110 to provided increased capacity without significantly altering the compliance monitoring, auditing, and reporting processes for various data privacy/security standards. Thus, the configuration of the system 100 illustrated in FIG. 1 provides improvements to the technical field of providing standards compliant encryption, storage, and retrieval of data.

Figure 2:
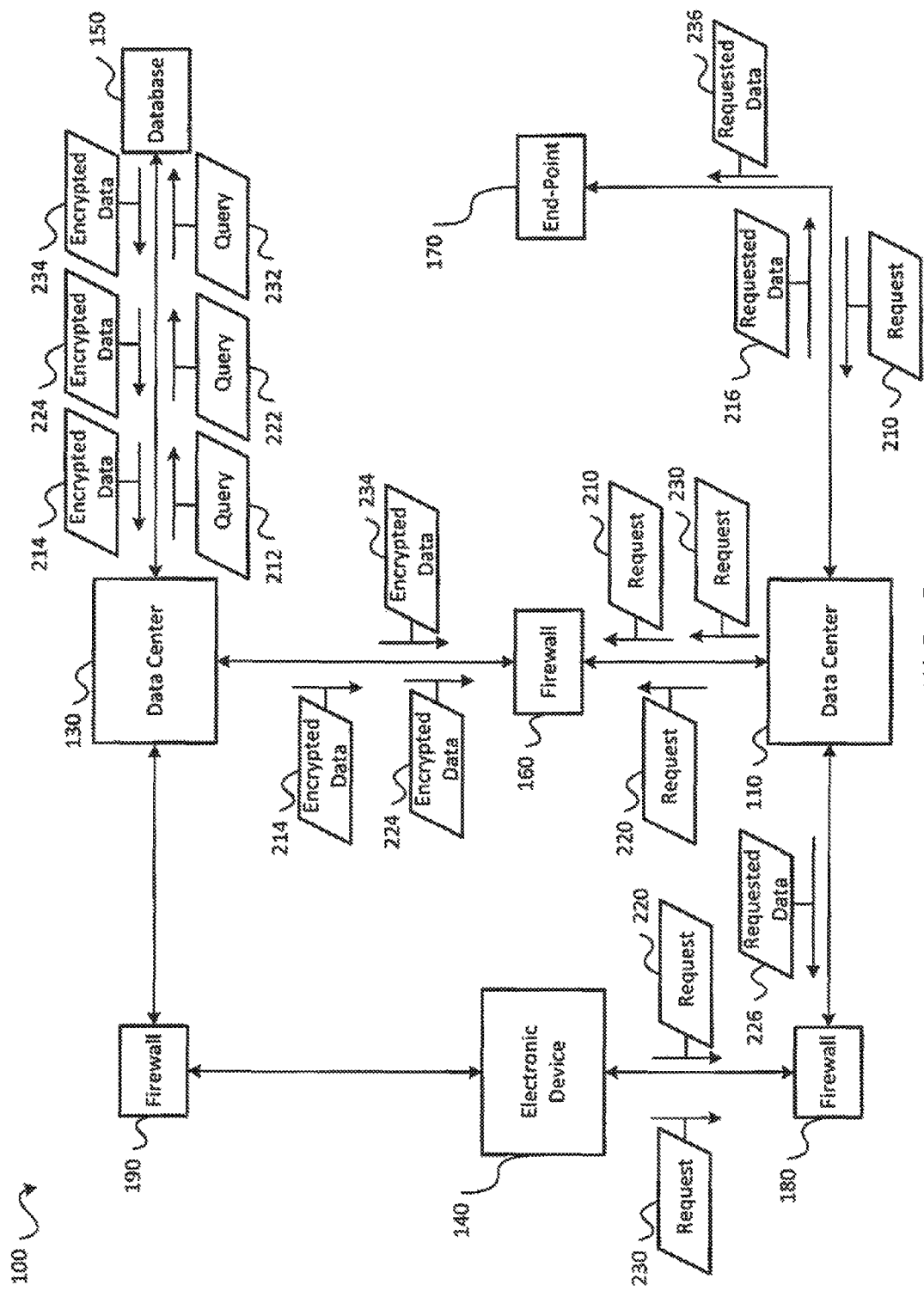
FIG. 2 is a block diagram illustrating additional aspects of an embodiment of a system for providing standards compliant encryption, storage, and retrieval of data.

Referring to FIG. 2, a block diagram illustrating additional aspects of embodiments of a system for providing standards compliant encryption, storage, and retrieval of data is shown. In FIG. 2, the system 100 of FIG. 1 is shown. Additionally, in FIG. 2, various data flows are shown and illustrate how data may be passed to and from various portions of the system 100 in connection with one or more embodiments.

In a first exemplary data flow according to embodiments, the end-point device 170 may send a request 210 to the data center 110 (e.g., via the proxy 122). In an embodiment, the request 210 may be a request to access data stored at the database 150. In response to receiving the request 210, the data center 110 may forward or otherwise communicate the request 210 to the data center 130 through the firewall 160 via a secure connection such an https connection, a virtual private network connection or other form of network communication. The data center 130, in response to receiving the request 210 from the data center 110, may generate a query 212 and provide the query 212 to the database 150. As a result of the query 212, encrypted data 214 may be retrieved from the database 150, and the encrypted data 214 may then be provided from the data center 130 to the end-point device 170 through the firewall 160 via a secure connection such an https connection, a virtual private network connection or other form of network communication, and the data center 110 as requested data 216. In an embodiment, the requested data 216 may be the same as the encrypted data 214 (e.g., the data center 110 does not decrypt the encrypted data 214 prior to providing it to the end-point device 170). In an additional or alternative embodiment, the requested data 216 may be decrypted data generated at the data center 110 by decrypting (e.g., using the security service(s) 118 and/or the encryption/decryption service(s) 120) the encrypted data 214. It is noted that the decrypted data may not be provided to the data center 130, thereby maintaining the data center 130 outside of the scope of the compliance monitoring, auditing, and reporting processes.

In a second exemplary data flow according to embodiments, the electronic device 140 may send a request 220 to the data center 110. In an embodiment, the request 220 may be a request to access data stored at the database 150. In response to receiving the request 220, the data center 110 may forward or otherwise communicate the request 220 to the dais center 130 through the firewall 160 via a secure connection such an https connection, a virtual private network connection or other form of network communication. The data center 130, in response to receiving the request 220 from the data center 110, may generate a query 222 and provide the query 222 to the database 150. As a result of the query 222, encrypted data 224 may be retrieved from the database 150, and the encrypted data 224 may then be provided from the data center 130 to the electronic device 140 through the firewall 160 via a secure connection such an https connection, a virtual private network connection or other form of network communication, and the data center 110 as requested data 226. In an embodiment, the requested data 226 may be the same as the encrypted data 214 (e.g., the data center 110 does not decrypt the encrypted data 224 prior to providing it to the end-point device 170). This may enable the electronic device 140 to access one or more of the backend services 138 that may utilize the encrypted data 224 to provide a service to a user of the electronic device 140. In an additional or alternative embodiment, the requested data 226 may be decrypted data generated at the data center 110 by decrypting (e.g., using the security service(s) 118 and/or the encryption/decryption service(s) 120) the encrypted data 224. It is noted that the decrypted data may not be provided to the data center 130, thereby maintaining the data center 130 outside of the scope of the compliance monitoring, auditing, and reporting processes.

In a third exemplary data flow according to embodiments, the electronic device 140 may send a request 230 to the data center 110. In an embodiment, the request 230 may be a request to process data stored at the database 150. For example, the request 230 may be a request to conduct a transaction using financial card information that has been previously stored at the database 150 in an encrypted format. In an embodiment, the request 230 may identify an address (e.g., an address of a web server) where data retrieved from the database 150 in response to the request 230 is to be provided. In response to receiving the request 230, the data center 110 may forward or otherwise communicate the request 230 to the data center 130 through the firewall 160 via a secure connection such an https connection, a virtual private network connection or other form of network communication. The data center 130, in response to receiving the request 230 from the data center 110, may generate a query 232 and provide the query 232 to the database 150. As a result of the query 232, encrypted data 234 may be retrieved from the database 150, and the encrypted data 234 may then be provided from the data center 130 to the end-point device 170 through the firewall 160 via a secure connection such as an https connection, a virtual private network connection or other form of network communication, and the data center 110 as requested data 236. In an embodiment, the requested data 236 may be the same as the encrypted data 214 (e.g., the data center 110 does not decrypt the encrypted data 234 prior to providing it to the end-point device 170). This may enable the electronic device 140 to access one or more of the backend services 138 that may utilize the encrypted data 224 to provide a service to a user of the electronic device 140 via one or more external systems (e.g., one or more external systems that communicate with the system 100 via the end-point device 170). In an additional or alternative embodiment, the requested data 236 may be decrypted data generated at the data center 110 by decrypting (e.g., using the security service(s) 118 and/or the encryption/decryption service(s) 120) the encrypted data 234. It is noted that the decrypted data may not be provided to the data center 130, thereby maintaining the data center 130 outside of the scope of the compliance monitoring, auditing, and reporting processes.

Figure 3:
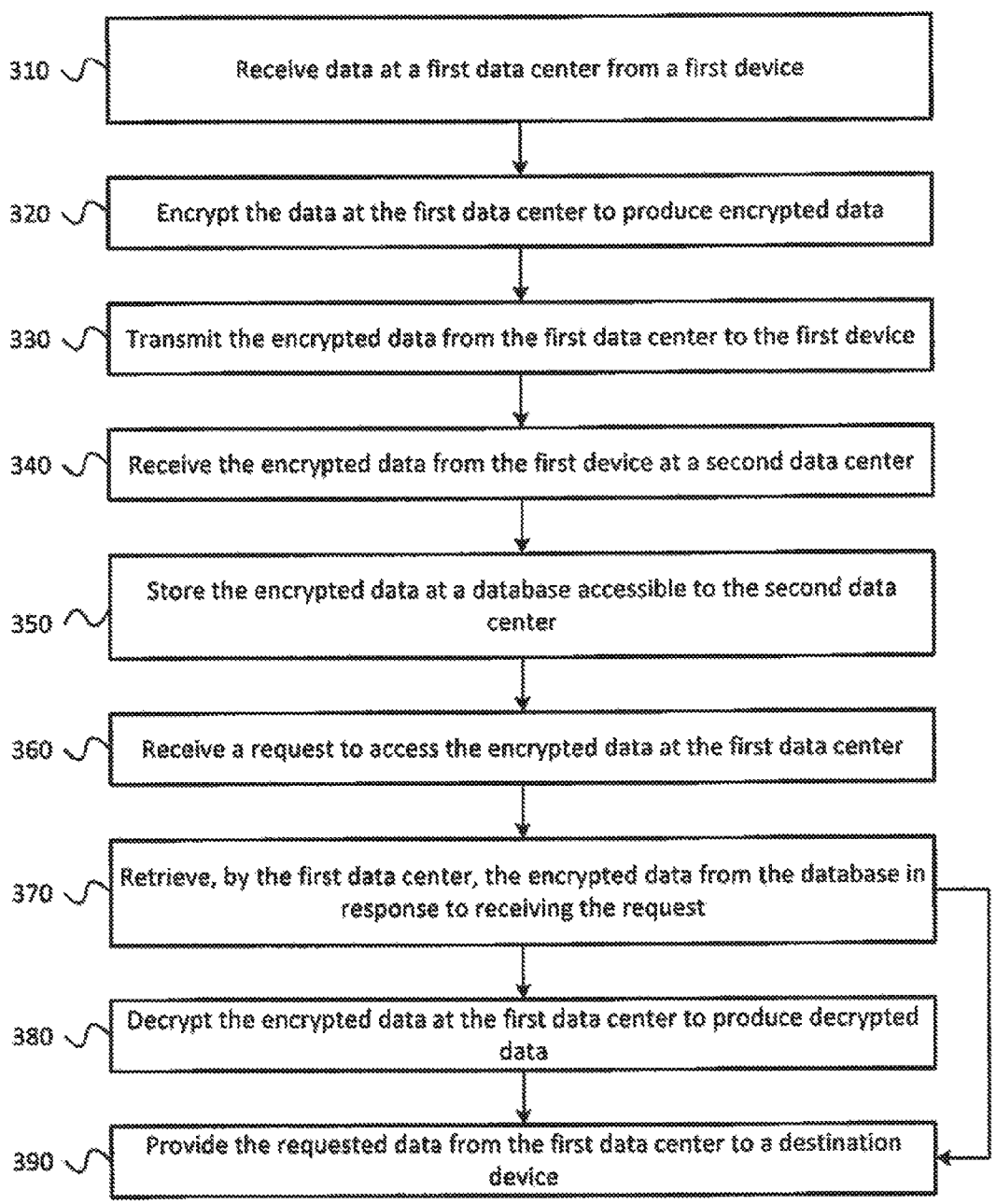
FIG. 3 is a flow chart of an embodiment of a method for providing standards compliant encryption, storage, and retrieval of data.

FIG. 3 is a flow diagram of an embodiment of a method for providing standards compliant encryption, storage, and retrieval of data is shown as a method 300. In an embodiment, the method 300 may be performed by the system 100 of FIGS. 1 and 2. In an embodiment, the method 300 may be stored as instructions (e.g., one or more of the instructions 116, 136, 146 of FIG. 1) that, when executed by a processor (e.g., one or more of the processors 112, 132, 142 of FIG. 1), cause the processor to perform the operations of the method 300 to provide standards compliant encryption, storage, and retrieval of data in accordance with one or more embodiments of the present disclosure.

At 310, the method 300 includes receiving data at a first data center from a first device. In an embodiment, the first data center may be the data center 110 of FIGS. 1 and 2, and the first device may be the electronic device 140 of FIGS. 1 and 2. In an additional or alternative embodiment, the first data center may be the data center 110 of FIGS. 1 and 2, and the first device may be the end-point device 170 of FIGS. 1 and 2. In an embodiment, the data may be received at the first data center in connection with a service request (e.g., a request to access one of the backend services 138 of FIG. 1). At 320, the method 300 includes encrypting the data at the first data center to produce encrypted data, and, at 330, transmitting the encrypted data from the first data center to the first device. The first device may receive the encrypted data from the first data center, and may transmit the encrypted data to a second data center. In an embodiment, the second data center may be the data center 130 of FIGS. 1 and 2. At 340, the second data center may receive the encrypted data, and, at 350, may store the encrypted data at a database accessible to the second data center. In an embodiment, the database may be the database 150 of FIGS. 1 and 2.

Subsequently, the method 300 may include, at 360, receiving, at the first data center, a request to access the encrypted data. In an embodiment, the request may be received in connection with providing a service (e.g., one of the backend services 138 of FIG. 1) to a user. At 370, the method 300 may include retrieving, by the first data center, the encrypted data from the database. In an embodiment, the first data center may communicate with the second data center to retrieve the encrypted information from the database, as described with reference to FIG. 2. In an embodiment, the data retrieved at 370 may be provided, at 390, from the first data center to a destination device. In an embodiment, the destination device may be the end-point device 170 of FIGS. 1 and 2. In an additional or alternative embodiment, the destination device may be a remote system that is communicatively coupled to the data centers via the end-point device 170. In still another additional or alternative embodiment, the destination device may be the electronic device 140 of FIGS. 1 and 2. In an embodiment, the method 300 may include, at 380, decrypting the encrypted data retrieved at 370, and then, at 390, providing the decrypted data to the destination device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing storage and retrieval of encrypted data comprising:
    receiving, at a first data center from a user device, data in connection with a service request, wherein the first data center is configured to provide encryption and decryption functionality;
    encrypting, by the first data center, the data to produce encrypted data;
    transmitting the encrypted data from the first data center to the user device;
    receiving, at a second data center, the encrypted data from the user device, wherein the second data center is configured to store and provide encrypted data in connection with providing services to one or more users;
    storing the encrypted data in a database accessible to the second data center;
    receiving, at the first data center, a request to access the encrypted data;
    in response to receiving the request, retrieving, by the first data center, the encrypted data from the database of the second data center;
    decrypting, at the first data center, the encrypted data to produce decrypted data; and
    providing, from the first data center, the decrypted data to an agent device, wherein the user of the user device and an agent of the agent device are different entities.

2. The method of claim 1, wherein the user device is communicatively coupled to the first data center via a first secure communication link, and wherein the user device is communicatively coupled to the second data center via a second secure communication link.

3. The method of claim 1, wherein the first data center does not include a database for storing user data.

4. The method of claim 1, further comprising periodically auditing the first data center to determine whether data that has been encrypted by the first data center has been stored at rest within the first data center in an unencrypted format.

5. The method of claim 1, wherein the first data center and the second data center are data centers of a money transfer network operated by a money transfer entity.

6. The method of claim 1, wherein the request comprises a hypertext transfer protocol (HTTP) message, wherein the data is included within a body of the HTTP message, and wherein a header of the HTTP message comprises information that identifies a location of the data within the body of the HTTP message.

7. The method of claim 6, wherein the header of the HTTP message further comprises information that identifies an address for transmitting the encrypted data to the agent device.

8. The method of claim 1, wherein the second data center comprises business logic configured to provide one or more services to the user of the user device, and wherein the one or more services utilize user data that has been encrypted by the first data center.

9. The method of claim 8, wherein the one or more services provided by the business logic comprise a money transfer service, a prepaid card loading service, a bill pay service, or a combination thereof.

10. A system for providing storage and retrieval of encrypted data using multiple data centers comprising:
 a first data center comprising:
  at least one processor;
  an encryption module executable by the at least one processor; and
  a communication interface configured to communicatively couple the first data center to a network; and
 a second data center comprising:
  at least one processor;
  a database; and
  a communication interface configured to communicatively couple the second data center to a network,
 wherein the first data center is configured to:
  receive data from a user device in connection with a service request;
  in response to receiving the request, encrypt the data to produce encrypted data;
  transmit the encrypted data from the first data center to the user device, and
 wherein the second data center is configured to:
  receive the encrypted data from the user device; and
  store the encrypted data at the database
 wherein the first data center is further configured to:
  receive a request to access the encrypted data;
  in response to receiving the request, retrieve the encrypted data from the database of the second data center;
  decrypt the encrypted data to produce decrypted data; and
  provide the decrypted data to an agent device, wherein the user and the agent are different entities wherein the user of the user device and an agent of the agent device are different entities.

11. The system of claim 10, wherein the first data center and the second data center are data centers of a money transfer network operated by a money transfer entity.

12. The system of claim 10, wherein the first data center does not include a database for storing user data, and wherein the second data center does not include decryption and encryption functionality.

13. The system of claim 10, further comprising periodically auditing the first data center to determine whether data that has been encrypted by the first data center has been stored at rest within the first data center in an unencrypted format.

14. The system of claim 10, wherein the first data center receives the request from the user device via a first communication link, and wherein the second data center receives the encrypted data from the user device via a second communication link.

15. The system of claim 10, wherein the request comprises a hypertext transfer protocol (HTTP) message, wherein the data is included within a body of the HTTP message, and wherein a header of the HTTP message comprises information that identifies a location of the data within the body of the HTTP message.

16. The system of claim 15, wherein the header of the HTTP message further comprises information that identifies an address for transmitting the encrypted data to the agent device.

17. The system of claim 10, wherein the second data center further comprises business logic configured to provide one or more services to the user of the user device, wherein the one or more services utilize encrypted data that has been stored at the database of the second data center.

18. The system of claim 17, wherein the one or more services provided by the business logic comprise a money transfer service, a prepaid card loading service, a bill pay service, or a combination thereof.

19. A non-transitory computer-readable storage medium storing instructions that, when executed by a processor, cause the processor to perform operations for providing storage and retrieval of encrypted data using multiple data centers, the operations comprising:
 receiving, by a first data center from a user device, data in connection with a service request, wherein the first data center is configured to provide encryption and decryption functionality;
 encrypting, by the first data center, the data to produce encrypted data;
 transmitting, by the first data center, the encrypted data to the user device;
 receiving, by a second data center, the encrypted data from the user device, wherein the second data center is configured to store and provide encrypted data;
 storing the encrypted data at a database accessible to the second data center;
 receiving, by the first data center, a request to access the encrypted data;
 in response to receiving the request, retrieving, by the first data center, the encrypted data from the database of the second data center;
 decrypting the encrypted data at the first data center to produce decrypted data; and
 providing the decrypted data from the first data center to an agent device, wherein a user of the user device and an agent of the agent device are different entities.

20. The non-transitory computer-readable storage medium of claim 19, wherein the user device is communicatively coupled to the first data center via a first secure communication link, and wherein the user device is communicatively coupled to the second data center via a second secure communication link.

21. The non-transitory computer-readable storage medium of claim 19, further comprising periodically auditing the first data center to determine whether data that has been encrypted by the first data center has been stored at rest within the first data center in an unencrypted format.

22. The non-transitory computer-readable storage medium of claim 19, wherein the first data center and the second data center are data centers of a money transfer network operated by a money transfer entity.

23. The non-transitory computer-readable storage medium of claim 19, wherein the first data center does not include a database for storing user data.

24. The non-transitory computer-readable storage medium of claim 23, wherein the second data center does not include decryption and encryption functionality.

25. The non-transitory computer-readable storage medium of claim 23, wherein the request comprises a hypertext transfer protocol (HTTP) message, wherein the data is included within a body of the HTTP message, and wherein a header of the HTTP message comprises information that identifies a location of the data within the body of the HTTP message.

26. The non-transitory computer-readable storage medium of claim 25, wherein the header of the HTTP message further comprises information that identifies an address for transmitting the encrypted data to the agent device.

27. The non-transitory computer-readable storage medium of claim 19, wherein the second data center comprises business logic configured to provide one or more services to the user of the user device, and wherein the one or more services utilize user data that has been encrypted by the first data center.

28. The non-transitory computer-readable storage medium of claim 27, wherein the one or more services provided by the business logic comprise a money transfer service, a prepaid card loading service, a bill pay service, or a combination thereof.

* * * * *

UNITED STATES PATENT AND TRADEMARK OFFICE
CERTIFICATE OF CORRECTION

Page 1 of 2

PATENT NO. : 9,992,175 B2
APPLICATION NO. : 14/991533
DATED : June 5, 2018
INVENTOR(S) : Aaron Ferguson Cooley It is certified that error appears in the above-identified patent and that said Letters Patent is hereby corrected as shown below:

On the Title Page

Item (57), ABSTRACT, Line number 3, delete "of date are disclosed" and replace with --of data are disclosed--.
Item (57), ABSTRACT, Line number 13, delete "second data canter" and replace with --second data center--.
Item (57), ABSTRACT, Line number 15, delete "date security standards" and replace with --data security standards--.

In the Specification

At Column 1, Line number 49, delete "cardholder date" and replace with --cardholder data--.
At Column 2, Line number 31, delete "generated fey" and replace with --generated by--.
At Column 3, Line number 10, delete "utilized in" and replace with --utilized as--.
At Column 3, Line number 55, delete "rearrangements with the spirit" and replace with --rearrangements within the spirit--.
At Column 4, Line number 13, delete "as encryption/decryption service" and replace with --an encryption/decryption service--.
At Column 4, Line number 19, delete "the instruction 116" and replace with --the instructions 116--.
At Column 4, Line number 20, delete "came the processor 112" and replace with --cause the processor 112--.
At Column 4, Line number 51, delete "servicers 138" and replace with --services 138--.
At Column 4, Line number 60, delete "the electronic device 148" and replace with --the electronic device 140--.
At Column 5, Line number 39, delete "in connection wife" and replace with --in connection with--.
At Column 5, Line number 42, delete "may fee a portal" and replace with --may be a portal--.
At Column 6, Line number 46, delete "requested date" and replace with --requested data--.
At Column 6, Line number 61, delete "the data center (130)" and replace with --the data center 130)--.
At Column 6, Line number 66, delete "operated fey" and replace with --operated by--.
At Column 7, Line number 4, delete "mosey transfer" and replace with --money transfer--.

Signed and Sealed this
Tenth Day of July, 2018

Andrei Iancu
*Director of the United States Patent and Trademark Office*

At Column 7, Line number 55, delete "that indentities a destination" and replace with --that identifies a destination--.

At Column 10, Line number 23, delete "the dais center" and replace with --the data center--.